US008557918B2

(12) United States Patent
Nelson et al.

(10) Patent No.: US 8,557,918 B2
(45) Date of Patent: Oct. 15, 2013

(54) POLYMER COMPOSITES

(75) Inventors: James M. Nelson, Woodbury, MN (US);
Ryan E. Marx, Rosemount, MN (US);
John W. Longabach, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/978,670

(22) Filed: Dec. 27, 2010

(65) Prior Publication Data

US 2011/0144238 A1 Jun. 16, 2011

Related U.S. Application Data

(62) Division of application No. 11/276,620, filed on Mar. 8, 2006, now Pat. No. 7,863,381.

(51) Int. Cl.
C08F 8/00 (2006.01)

(52) U.S. Cl.
USPC ........... 525/107; 525/165; 525/191; 525/192; 525/242

(58) Field of Classification Search
USPC .......................... 525/107, 165, 191, 192, 242
See application file for complete search history.

(56) References Cited

U.S. PATENT DOCUMENTS

| | | | |
|---|---|---|---|
| 4,367,310 A | 1/1983 | Henton | |
| 4,415,615 A | 11/1983 | Esmay et al. | |
| 5,276,175 A | 1/1994 | Dams et al. | |
| 5,721,322 A | 2/1998 | Lu et al. | |
| 6,491,903 B1 | 12/2002 | Forster et al. | |
| 6,764,628 B2 | 7/2004 | Lobovsky et al. | |
| 6,900,264 B2 | 5/2005 | Kumar et al. | |
| 6,969,491 B1 | 11/2005 | Marx et al. | |
| 6,995,222 B2 * | 2/2006 | Buckanin et al. | 526/242 |
| 7,001,556 B1 | 2/2006 | Shambaugh | |
| 7,402,625 B2 | 7/2008 | Cernohous et al. | |
| 7,411,019 B1 * | 8/2008 | Bley | 524/847 |
| 7,837,899 B2 | 11/2010 | Moad et al. | |
| 2004/0024130 A1 | 2/2004 | Nelson et al. | |
| 2004/0106741 A1 | 6/2004 | Kriesel et al. | |
| 2004/0234445 A1 | 11/2004 | Serp et al. | |
| 2005/0137355 A1 | 6/2005 | Buckanin et al. | |
| 2005/0249957 A1 * | 11/2005 | Jing et al. | 428/421 |
| 2006/0287441 A1 | 12/2006 | Miyama et al. | |

FOREIGN PATENT DOCUMENTS

| | | |
|---|---|---|
| EP | 0 640 655 A2 | 3/1995 |
| JP | 2005-320220 * | 11/2005 |
| KR | 2005-0109955 | 11/2005 |
| WO | WO 03/002456 A2 | 1/2003 |
| WO | WO 2005/073305 A1 | 8/2005 |
| WO | WO-2005/073305 A1 * | 8/2005 |
| WO | WO 2005/108485 A2 | 11/2005 |
| WO | WO-2007/102980 A1 * | 9/2007 |
| WO | WO 2007/102980 A1 | 9/2007 |

OTHER PUBLICATIONS

Datsyuk, V., et al.; "Double Walled Carbon nanotube/Polymer Composites Via In-Situ Nitroxide Mediated Polymerisation Of Amphiphilic Block Copolymers", Letters to the Editor/Carbon, vol. 43, 2005, pp. 855-894.
Shofner, M. L. et al.; "Single Wall Nanotube And Vapor Grown Carbon Fiber Reinforced Polymers Processed By Extrusion Freeform Fabrication", Composites: Part A: Applied Science and Manufacturing, vol. 34, 2003, pp. 1207-1217.
Behzadi et al., "Yielding Behavior Of Model Epoxy Matrices For Fiber Reinforced Composites: Effect Of Strain Rate And Temperature", Sep. 2005, Journal of Macromolecular Science, Part B: Physics, 44, pp. 993-1005.
Wang et al., "Rapidly Functionalized, Water-Dispersed Carbon Nanotubes At High Concentration", Journal of the American Chemical Society, 2006, vol. 128, pp. 95-99.
Kang et al., "Micelle-Encapsulated Carbon Nanotubes: A Route To Nanotube Composites". Journal of the American Chemical Society, 2003, vol. 125, pp. 5650-5651.
Smits, "Measurement Of Sheet Resistivites With The Four-Point Probe", The Bell System Technical Journal, May 1958, pp. 711-718.
Logan, "Sheet Resistivity Measurements On Rectangular Surfaces—General Solution For Four Point Probe Conversion Factors", The Bell System Technical Journal, Dec. 1967, pp. 2277-2322.
Goodman, "Handbook Of Thermoset Plastics", Second Edition, Noyes Publications, Westwood, New Jersey, 1998.

* cited by examiner

Primary Examiner — Peter D. Mulcahy
Assistant Examiner — Henry Hu
(74) Attorney, Agent, or Firm — Philip Y. Dahl

(57) ABSTRACT

Compositions comprising a plurality of carbon nanotubes, a host polymer, and A block copolymer comprising a first block and a second block, wherein no block is compatible with the host polymer. In one aspect, the block copolymer is amphiphilic. In another aspect, the block copolymer may comprise a first block and a second block, wherein at least one of the first and second blocks comprises repeating units derived from a monomer having the general formula:

$$(R)_2C=C(R)(R_f)$$

wherein $R_f$ is selected from fluorine, a $C_1$ to $C_{10}$ fluorinated or perfluorinated alkyl group, and a $C_1$ to $C_{10}$ fluorinated or perfluorinated alkoxy group; each R is independently selected from F, H, Cl, $R_f$, a $C_1$ to $C_{10}$ alkyl group, and $R_2A$, wherein $R_2$ is a $C_1$ to $C_{10}$ alkylene group and A is selected from $CO_2M$ and $SO_3M$, wherein M is selected from H, an ammonium and organo onium group.

2 Claims, No Drawings

POLYMER COMPOSITES

CROSS REFERENCE TO RELATED APPLICATION

This application is a divisional of U.S. Ser. No. 11/276,620, filed Mar. 8, 2006, issued as U.S. Pat. No. 7,863,381 on Jan. 4, 2011, the disclosure of which is incorporated by reference in its entirety herein.

SUMMARY

In one aspect, the present invention relates to a composition comprising a plurality of carbon nanotubes, a host polymer, and an amphiphilic block copolymer comprising a first block and a second block, wherein no block is compatible with the host polymer.

In another aspect, the present invention relates to a composition comprising a plurality of carbon nanotubes, a host polymer, and a block copolymer comprising a first block and a second block, wherein no block is compatible with the host polymer and wherein at least one of the first and second blocks comprises repeating units derived from a monomer having the general formula $(R)_2C=C(R)(R_f)$. $R_f$ is selected from fluorine, a $C_1$ to $C_{10}$ fluorinated alkyl group, a $C_1$ to $C_{10}$ perfluorinated alkyl group, a $C_1$ to $C_{10}$ fluorinated alkoxy group, and a $C_1$ to $C_{10}$ perfluorinated alkoxy group; each R is independently selected from F, H, Cl, $R_f$, a $C_1$ to $C_{10}$ alkyl group, and $R_2A$, wherein $R_2$ is a $C_1$ to $C_{10}$ alkylene group and A is selected from $CO_2M$ and $SO_3M$, wherein M is selected from H, an ammonium and organo onium group.

In yet another aspect, the present invention relates to a shaped article comprising a composition comprising a plurality of carbon nanotubes, a host polymer, and an amphiphilic block copolymer comprising a first block and a second block, wherein no block is compatible with the host polymer.

In yet a further aspect, the present invention relates to a composition comprising a plurality of carbon nanotubes, a thermoset polymer, and a controlled architecture material having at least one hexafluoropropylene oxide methacrylate block.

In another aspect, the present invention relates to a composition comprising a plurality of carbon nanotubes, a thermoset polymer, and a controlled architecture material having at least one styrene block and at least one 4-vinyl pyridine block.

As used herein, a block of a copolymer, for instance, block A in a block copolymer given by the general formula ABC, is considered as being compatible with the host polymer if the polymer A identical to this block (i.e., without the B and C blocks) is compatible with the host polymer in the molten state. Similarly, block A is considered incompatible with the host polymer if the polymer A identical to block A is incompatible with the host polymer. In general, "compatibility between two polymers" means the ability of one to dissolve in the other in the molten state, or alternatively, their total miscibility. In the opposite case, the polymers are said to be incompatible.

When mixing two distinct polymers, a lower value of the heat of mixing indicates greater compatibility. In certain cases, there is a favorable specific interaction between the monomers which is reflected by a negative heat of mixing for the corresponding polymers. In the context of the present invention, it is preferred to avoid block copolymers whose heat of mixing with the host polymer is negative.

However, the heat of mixing cannot be measured conventionally for all polymers, and thus the compatibility can only be determined indirectly, for example by viscoelastic analysis measurements, in torsion oscillation or alternatively by differential calorimetric analysis. Mixtures of compatible polymers may display one or two glass transition temperature values (Tg). Where two separate Tg values are detected for a mixture containing compatible polymers, at least one of the two Tg values is different from the Tg values of the pure polymers and is in the range between the two Tg values of the pure polymers. The mixture of two totally miscible polymers has only one Tg value.

With respect to thermosets, for instance an epoxy, compatibility is measured in the final cured state of the thermoset. For instance, while a polymer may be compatible with an epoxy monomer, if a mixture of the polymer and epoxy polymer shows two distinct Tg values corresponding to the Tg values of the pure polymers (that is, the polymer of the block and the thermoset epoxy), the polymer and the epoxy polymer are considered to be not compatible.

Other experimental methods that may demonstrate the compatibility of polymers include turbidity measurements, light-scattering measurements, and infrared measurements.

DETAILED DESCRIPTION

The host polymer is not particularly limited, and may be any of a number of thermoplastic polymers and thermoplastic elastomeric polymers or thermoset polymers, which may be fluorinated or non-fluorinated.

Useful thermoset polymers include, generally, amino thermosets such as for example thermoset polyimides, bismaleimides (BMI's), and thermoplastic amide-imide systems, cyanate esters, furans, polyesters, phenolics, epoxies, polyurethanes, silicones, allyls, and cross-linked thermoplastics. Phenolic thermoset polymers include phenol-formaldehyde, such as novolac phenol-formaldehyde resins and resole phenolic resins. Thermoset epoxy polymers include the diglycidyl ether of bisphenol A, glycidyl amines, novolacs, peracid resins, and hydantoin resins. Other examples of useful thermoset polymers include those described in "Handbook of Thermoset Plastics" by Goodman ($2^{nd}$ ed., 1998).

Useful thermoplastic polymer resins include polylactones such as, for example, poly(pivalolactone) and poly(caprolactone); polyurethanes such as, for example, those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl) carbonate), poly(1,1-ether bis(4-phenyl) carbonate), poly (diphenylmethane bis(4-phenyl)carbonate), poly(1,1-cyclohexane bis(4-phenyl)carbonate), or poly(2,2-(bis(4-hydroxyphenyl) propane) carbonate; polysulfones; polyether ether ketones; polyamides such as, for example, poly(4-aminobutyric acid), poly(hexamethylene adipamide), poly(6-aminohexanoic acid), poly(m-xylylene adipamide), poly(p-xylylene sebacamide), poly(metaphenylene isophthalamide), and poly(p-phenylene terephthalamide); polyesters such as, for example, poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy-benzoate), poly(1,4-cyclohexylidene-dimethylene terephthalate) (cis), poly(1,4-cyclohexylidene-dimethylene terephthalate) (trans), polyethylene terephthalate, and polybutylene terephthalate; poly(arylene oxides) such as, for example, poly(2,6-dimethyl-1,4-phenylene oxide) and poly(2,6-diphenyl-1,1phenylene oxide); poly (arylene sulfides) such as, for example, polyphenylene sulfide; polyetherimides; vinyl polymers and their copolymers such as, for example, polyvinyl acetate, polyvinyl alcohol, polyvinyl chloride, polyvinyl butyral, polyvinylidene chloride, and ethylene-vinyl acetate copolymers; acrylic polymers such as, for example, poly(ethyl acrylate), poly(n-butyl acrylate), poly(methyl methacrylate), poly(ethyl methacrylate), poly(n-butyl methacrylate), poly(n-propyl methacrylate), polyacrylamide, polyacrylonitrile, polyacrylic acid, ethylene-ethyl acrylate copolymers, ethylene-acrylic acid copolymers; acrylonitrile copolymers (e.g., poly(acrylonitrile-co-butadiene-co-styrene) and poly(styrene-co-acrylonitrile)); styrenic polymers such as, for example, polystyrene, poly(styrene-co maleic anhydride) polymers and their derivatives, methyl methacrylate-styrene copolymers, and methacrylated butadiene-styrene copolymers; polyolefins such as, for example, polyethylene, polybutylene, polypropylene, chlorinated low density polyethylene, poly(-methyl-1-pentene); ionomers; poly(epichlorohydrins); polysulfones such as, for example, the reaction product of the sodium salt of 2,2-bis(4-hydroxyphenyl) propane and 4,4'-dichlorodiphenyl sulfone; furan resins such as, for example, poly(furan); cellulose ester plastics such as, for example, cellulose acetate, cellulose acetate butyrate, and cellulose propionate; protein plastics; polyarylene ethers such as, for example, polyphenylene oxide; polyimides; polyvinylidene halides; polycarbonates; aromatic polyketones; polyacetals; polysulfonates; polyester ionomers; and polyolefin ionomers. Copolymers and/or combinations or blends of these aforementioned polymers can also be used.

Useful thermoplastic elastomeric polymeric resins include, for example, polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, block copolymers, made up of segments of glassy or crystalline blocks such as polystyrene, poly(vinyltoluene), poly(t-butylstyrene), polyester and the like and the elastomeric blocks such as polybutadiene, polyisoprene, ethylene-propylene copolymers, ethylene-butylene copolymers, polyether ester and the like as for example the copolymers in poly(styrene-butadiene-styrene) block copolymer manufactured by Shell Chemical Company under the trade name of "KRATON". Copolymers and/or combinations or blends of these aforementioned polymers can also be used Useful polymeric resins also include fluoropolymers, that is, at least partially fluorinated polymers. Useful fluoropolymers include, for example, those that are preparable (e.g., by free-radical polymerization) from monomers comprising chlorotrifluoroethylene, 2-chloropentafluoropropene, 3-chloropentafluoropropene, vinylidene fluoride, trifluoroethylene, tetrafluoroethylene, 1-hydropentafluoropropene, 2-hydropentafluoropropene, 1,1-dichlorofluoroethylene, dichlorodifluoroethylene, hexafluoropropylene, vinyl fluoride, a perfluorinated vinyl ether (e.g., a perfluoro(alkoxy vinyl ether) such as $CF_3OCF_2CF_2CF_2OCF=CF_2$, or a perfluoro(alkyl vinyl ether) such as perfluoro(methyl vinyl ether) or perfluoro(propyl vinyl ether)), cure site monomers such as for example nitrile containing monomers (e.g., $CF_2=CFO(CF_2)_LCN$, $CF_2=CFO[CF_2CF(CF_3)O]_q(CF_2O)_yCF(CF_3)CN$, $CF_2=CF[OCF_2CF(CF_3)]_rO(CF_2)_tCN$, or $CF_2=CFO(CF_2)_uOCF(CF_3)CN$ where L=2-12; q=0-4; r=1-2; y=0-6; t=1-4; and u=2-6), bromine containing monomers (e.g., $Z—R_f—O_x—CF=CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1); or a combination thereof, optionally in combination with additional non-fluorinated monomers such as, for example, ethylene or propylene. Specific examples of such fluoropolymers include polyvinylidene fluoride; terpolymers of tetrafluoroethylene, hexafluoropropylene and vinylidene fluoride; copolymers of tetrafluoroethylene, hexafluoropropylene, perfluoropropyl vinyl ether, and vinylidene fluoride; tetrafluoroethylene-hexafluoropropylene copolymers; tetrafluoroethylene-perfluoro(alkyl vinyl ether) copolymers (e.g., tetrafluoroethylene-perfluoro(propyl vinyl ether)); and combinations thereof.

Useful commercially available thermoplastic fluoropolymers include, for example, those marketed by Dyneon LLC under the trade designations "THV" (e.g., "THV 220", "THV 400G", "THV 500G", "THV 815", and "THV 610X"), "PVDF", "PFA", "HTE", "ETFE", and "FEP"; those marketed by Atochem North America, Philadelphia, Pa. under the trade designation "KYNAR" (e.g., "KYNAR 740"); those marketed by Ausimont, USA, Morristown, N.J. under the trade designations "HYLAR" (e.g., "HYLAR 700") and "HALAR ECTFE".

Block copolymers are generally formed by sequentially polymerizing different monomers or groups of monomers. That is, each block of a block copolymer may be chosen from homopolymers and copolymers. Useful methods for forming block copolymers include anionic, cationic, and free radical polymerization methods.

Useful thermoplastic block copolymers may have any number of segments (i.e., blocks) greater than or equal to two (e.g., di-, tri-, tetra-block copolymers), and may have any form such as, for example, linear, star, comb, or ladder. Generally, at least one segment should have an affinity for the carbon nanotube. This segment may be hydrophilic or hydrophobic in nature (e.g., depending on whether the surface of the carbon nanotube is modified). As used herein, controlled architecture materials (CAMs), are polymers of varying topology (linear, branched, star, star-branched, combination network), composition (di-, tri-, and multi-block copolymer, random block copolymer, random copolymers, homopolymer, tapered or gradient copolymer, star-branched homo-, random, and block copolymers), and/or functionality (end, site specific, telechelic, multifunctional, macromonomers). Where a CAM is referred to herein to comprise "at least one [monomer] block" it is meant that at least one block of the CAM comprises interpolymerized units derived from the indicated monomer. Such a block may be a homopolymer of the recited monomer or a copolymer which comprises the recited monomer and at least one further monomer.

Hydrophilic segments typically have one or more polar moieties such as, for example, acids (e.g., —$CO_2H$, —$SO_3H$, —$PO_3H$); —OH; —SH; primary, secondary, or tertiary amines; ammonium N-substituted or unsubstituted amides and lactams; N-substituted or unsubstituted thioamides and thiolactams; anhydrides; linear or cyclic ethers and polyethers; isocyanates; cyanates; nitriles; carbamates; ureas; thioureas; heterocyclic amines (e.g., pyridine or imidazole). Useful monomers that may be used to introduce polar moieties are well known and include, for example, acids (e.g., acrylic acid, methacrylic acid, itaconic acid, maleic acid, fumaric acid), acrylates and methacrylates (e.g., 2-hydroxyethyl acrylate), acrylamides and methacrylamides (e.g., acrylamide, t-butyl acrylamide, N,N-(dimethylamino)ethyl acrylamide, N,N-dimethyl-acrylamide, N,N-dimethyl methacrylamide), methacrylamides, N-substituted and N,N-disubstituted acrylamides (e.g., N-ethyl acrylamide, N-hydroxyethyl-acrylamide, N-octyl-acrylamide, N-t-butyl-acrylamide, N,N-dimethyl acrylamide, N,N-diethyl-acrylamide, and N-ethyl-N-dihydroxyethyl-acrylamide), aliphatic amines (e.g., 3-dimethylaminopropyl amine, N,N-dimethylethylenediamine); and heterocyclic-containing monomers (e.g., 2-vinylpyridine, 4-vinylpyridine, 2-(2-aminoethyl)pyridine, 1-(2-aminoethyl)pyrrolidine, 3-aminoquinuclidine, N-vinylpyrrolidone, and N-vinylcaprolactam). Also of interest is the methacrylic anhydride functionality formed via the acid catalyzed deprotection of t-butyl methacrylate moieties as described in pending application U.S. patent application publication No. US 2004/0024130 A1 (Nelson et al.).

In one embodiment, if any block of the amphiphilic block copolymer comprises ionic or ionizable functions, the monomer bearing the ionic or ionizable functions constitutes from 0.01 to 10% by weight of the total weight of the block comprising the ionic or ionizable functions. Examples of ionic or ionizable function bearing monomers includes, for instance, monomers bearing functional groups such as acids, anhydrides, or amino groups. Monomers having ionic or ionizable functions include, for instance, acrylic acid, methacrylic acid, and maleic anhydride.

In other embodiments, the block copolymer comprises a monomer having a functional group that is labile with heat to produce a functional group that facilitates the dispersion of the carbon nanotubes in the host polymer as described in pending application U.S. patent application publication No. US 2004/0024130 A1 (Nelson et al.).

Hydrophobic segments typically have one or more hydrophobic moieties such as for example, aliphatic and aromatic hydrocarbon moieties. Examples include those moieties having at least about 4, 8, 12, or even 18 carbon atoms; fluorinated aliphatic and/or fluorinated aromatic hydrocarbon moieties, such as for example, those having at least about 4, 8, 12, or even 18 carbon atoms; and silicone moieties.

Useful monomers for introducing hydrophobic segments include, for example: hydrocarbon olefins such as ethylene, propylene, isoprene, styrene, and butadiene; cyclic siloxanes such as decamethylcyclopentasiloxane and decamethyltetrasiloxane; fluorinated olefins such as tetrafluoroethylene, hexafluoropropylene, trifluoroethylene, difluoroethylene, and chlorofluoroethylene.

Other useful monomers include nonfluorinated alkyl acrylates and methacrylates such as butyl acrylate, isooctyl methacrylate lauryl acrylate, stearyl acrylate; fluorinated acrylates such as perfluoroalkylsulfonamidoalkyl acrylates and methacrylates having the formula $H_2C=C(R_2)C(O)O—X—N(R)SO_2R_f$ wherein: $R_f$ is $—C_6F_{13}$, $—C_4F_9$, or $—C_3F_7$; R is hydrogen, $C_1$ to $C_{10}$ alkyl, or $C_6$-$C_{10}$ aryl; and X is a divalent connecting group (e.g., $C_4F_9SO_2N(CH_3)C_2H_4OC(O)NH(C_6H_4)CH_2C_6H_4NHC(O)OC_2H_4OC(O)CH=CH_2$ and

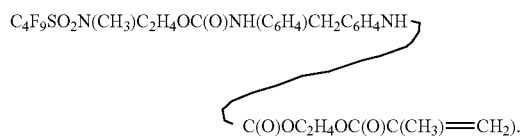

$C_4F_9SO_2N(CH_3)C_2H_4OC(O)NH(C_6H_4)CH_2C_6H_4NH—C(O)OC_2H_4OC(O)C(CH_3)=CH_2)$.

Examples of useful block copolymers having hydrophobic and hydrophilic segments include poly(isoprene-block-4-vinylpyridine); poly(isoprene-block-methacrylic acid); poly(isoprene-block-N,N-(dimethylamino)ethyl acrylate); poly(isoprene-block-2-diethylaminostyrene); poly(isoprene-block-glycidyl methacrylate); poly(isoprene-block-2-hydroxyethyl methacrylate); poly(isoprene-block-N-vinylpyrrolidone); poly(isoprene-block-methacrylic anhydride); poly(isoprene-block-(methacrylic anhydride-co-methacrylic acid)); poly(styrene-block-4-vinylpyridine); poly(styrene-block-2-vinylpyridine); poly(styrene-block-acrylic acid); poly(styrene-block-methacrylamide); poly(styrene-block-N-(3-aminopropyl)methacrylamide); poly(styrene-block-N,N-(dimethylamino)ethyl acrylate); poly(styrene-block-2-diethylaminostyrene); poly(butylene-block-4-vinylpyridine); poly(styrene-block-glycidyl methacrylate); poly(styrene-block-2-hydroxyethyl methacrylate); poly(styrene-block-N-vinylpyrrolidone copolymer); poly(styrene-block-isoprene-block-4-vinylpyridine); poly(styrene-block-isoprene-block-glycidyl methacrylate); poly(styrene-block-isoprene-block-methacrylic acid); poly(styrene-block-isoprene-block-(methacrylic anhydride-co-methacrylic acid)); poly(styrene-block-isoprene-block-methacrylic anhydride); butadiene-block-4-vinylpyridine); poly(butadiene-block-methacrylic acid); poly(butadiene-block-N,N-(dimethylamino)ethyl acrylate); poly(butadiene-block-2-diethylaminostyrene); poly(butadiene-block-glycidyl methacrylate); poly(butadiene-block-2-hydroxyethyl methacrylate); poly(butadiene-block-N-vinylpyrrolidone); poly(butadiene-block-methacrylic anhydride); poly(butadiene-block-(methacrylic anhydride-co-methacrylic acid); poly(styrene-block-butadiene-block-4-vinylpyridine); poly(styrene-block-butadiene-block-methacrylic acid); poly(styrene-block-butadiene-block-N,N-(dimethylamino)ethyl acrylate); poly(styrene-block-butadiene-block-2-diethylaminostyrene); poly(styrene-block-butadiene-block-glycidyl methacrylate); poly(styrene-block-butadiene-block-2-hydroxyethyl methacrylate); poly(styrene-block-butadiene-block-N-vinylpyrrolidone); poly(styrene-block-butadiene-block-methacrylic anhydride); poly(styrene-block-butadiene-block-(methacrylic anhydride-co-methacrylic acid)); and hydrogenated forms of poly(butadiene-block-4-vinylpyridine), poly(butadiene-block-methacrylic acid), poly(butadiene-block-N,N-(dimethylamino)ethyl acrylate), poly(butadiene-block-2-diethylaminostyrene), poly(butadiene-block-glycidyl methacrylate), poly(butadiene-block-2-hydroxyethyl methacrylate), poly(butadiene-block-N-vinylpyrrolidone), poly(butadiene-block-methacrylic anhydride), poly(butadiene-block-(methacrylic anhydride-co-methacrylic acid)), poly(isoprene-block-4-vinylpyridine), poly(isoprene-block-methacrylic acid), poly(isoprene-block-N,N-(dimethylamino)ethyl acrylate), poly(isoprene-block-2-diethylaminostyrene), poly(isoprene-block-glycidyl methacrylate), poly(isoprene-block-2-hydroxyethyl methacrylate), poly(styrene-block-butylene-block-4-vinylpyridine), poly(isoprene-block-N-vinylpyrrolidone), poly(isoprene-block-methacrylic anhydride), poly(isoprene-block-(methacrylic anhydride-co-methacrylic acid)), poly(styrene-block-isoprene-block-glycidyl methacrylate), poly(styrene-block-isoprene-block-methacrylic acid), poly(styrene-block-isoprene-block-methacrylic anhydride-co-methacrylic acid), styrene-block-isoprene-block-methacrylic anhydride, poly(styrene-block-butadiene-block-4-vinylpyridine), poly(styrene-block-butadiene-block-methacrylic acid), poly(styrene-block-butadiene-block-N,N-(dimethylamino)ethyl acrylate), poly(styrene-block-butadiene-block-2-diethylaminostyrene), poly(styrene-block-butadiene-block-glycidyl methacrylate), poly(styrene-block-butadiene-block-2-hydroxyethyl methacrylate), poly(styrene-block-butadiene-block-N-vinylpyrrolidone), poly(styrene-block-butadiene-block-methacrylic anhydride), poly(styrene-block-butadiene-block-(methacrylic anhydride-co-methacrylic acid), poly (MeFBSEMA-block-methacrylic acid) (wherein "MeFBSEMA" refers to 2-(N-methylperfluorobutane-sulfonamido)ethyl methacrylate), poly(MeFBSEMA-block-methacrylic anhydride), and poly(MeFBSEMA-block-(methacrylic acid-co-methacrylic anhydride)).

Other CAMs useful in the present invention include those comprising at least one styrene block and at least one hexafluoropropylene oxide methacrylate block; those comprising at least one behenyl acrylate block and at least one block derived from interpolymerized units of the formula $CH_2=C(CH_3)CO_2CH_2CH_2O_2C-NH-C_6H_4-CH_2-C_6H_4-NHCO_2CH_2CH_2N(CH_3)SO_2C_4F_9$; and those comprising at least one isoprene block and at least one block derived from interpolymerized units having the formula $CH_2=C(CH_3)CO_2CH_2CH_2S-[CH_2CH(CO_2CH_2CH_2N(CH_3)SO_2C_4F_9)]_n-Y$, where n is selected from 1 to 6 and wherein Y is selected from H and a group derived from a radical source, such as, for instance, C1 to C10 alkyl, particularly isopropyl, and alkaryl, such as phenyl and benzyl.

In yet further embodiments, the block copolymer may comprise a first block and a second block, wherein no block is compatible with the host polymer and wherein at least one of the first and second blocks comprises repeating units derived from a monomer having the general formula $(R)_2C=C(R)(R_f)$. In this embodiment, $R_f$ is selected from fluorine, a $C_1$ to $C_{10}$ fluorinated alkyl group, a $C_1$ to $C_{10}$ perfluorinated alkyl group, a $C_1$ to $C_{10}$ fluorinated alkoxy group, and a $C_1$ to $C_{10}$ perfluorinated alkoxy group; each R is independently selected from F, H, Cl, $R_f$, a $C_1$ to $C_{10}$ alkyl group, and $R_2A$, wherein $R_2$ is a $C_1$ to $C_{10}$ alkylene group and A is selected from $CO_2M$ and $SO_3M$, wherein M is selected from H, an ammonium and organo onium group.

In other embodiments, the compositions described herein may comprise a plurality of carbon nanotubes; a thermoset polymer, including a cured epoxy resin; and a controlled architecture material. The controlled architecture material may be as described herein, including a controlled architecture material comprising at least one hexafluoropropylene oxide methacrylate block or a controlled architecture material comprising at least one styrene block and at least one 4-vinyl pyridine block.

The carbon nanotubes used in the present invention are not particularly limited. Carbon nanotubes may be single-walled carbon nanotubes (SWCNT) or double walled carbon nanotubes (DWCNT). The DWCNTs may be obtained by any means, including, for instance, catalytic chemical vapor deposition. Such preparations techniques may give approximately 80% DWCNTs, having a diameter ranging between 1 and 3 nm and a length that can reach 100 µm. The electrical conductivity of such nanotubes may be greater than 25 S/cm when they are pressed into the form of pellets.

Other carbon nanotubes include multi-walled nanotubes (MWCNTs). The MWCNTs may be obtained by vapor deposition in the presence of a supported catalyst, such as described in PCT published patent application WO 03/002456 A 2. MWCNTs so prepared may show, by transmission electron microscopy, that close to 100% of the tubes are MWCNTs. Such MWCNTs may have a diameter ranging between 10 and 50 nm and a length that can attain 70 µm. The electrical conductivity of such MWCNTs may reach greater than 20 S/cm when pressed in the form of pellets.

The SWCNTs, DWCNTs, and MWCNTs may be purified by washing with acid solution (such as sulphuric acid and hydrochloric acid) so as to rid them of residual inorganic and metal impurities. SWCNTs may also be noncovalently modified by encasing the nanotubes within cross-linked, amphiphilic copolymer micelles, such as described by Kang and Taton in *Journal of the American Chemical Society*, vol. 125, 5650 (2003). In another embodiment, the carbon nanotubes may be surface-functionalized, for instance, as described by Wang, Iqbal, and Mitra in *Journal of the American Chemical Society*, vol. 128, 95 (2006).

Shaped articles may also be formed which comprise a carbon nanotube; a host polymer; and a block copolymer comprising a first block and a second block, wherein no block is compatible with the host polymer. In these shaped articles, the carbon nanotubes may be dispersed in the host polymer. In some embodiments, the host polymer is electrically non-conductive, whereas the composite article itself is electrically conductive. Shaped articles formed from these compositions may have a variety of applications, such as for aerospace parts and for equipment. The preparation of shaped articles, in some instances, may depend on the availability of dispersible conductive filler with a low percolation threshold. The present invention, in some embodiments, may allow for the lowering of filler (e.g., carbon nanotube) concentration which in turn may: i) lower the costs associated with such shaped articles, and/or ii) improve the structural properties of the host polymer for those composites formed with the carbon nanotubes and block copolymer compared to the host polymer shaped in the absence of the carbon nanotube and block copolymer (e.g., melt viscosity, transparency, color).

Shaped articles according to the present invention include, for instance, applications for forming electrodes for flat panel displays, such as, for instance, touch screens and electroluminescent lamp backlights. Other articles include antistatic films for electrostatic discharge protection, electromagnetic interference shielding, and radio frequency interference shielding. Still other articles include field emission displays, organic light emitting diodes, and alternating current high field electroluminescent lamps.

Still further shaped articles according to the present invention include those selected from the group comprising an aerospace component, and an item of sports equipment. By aerospace component, it is meant structural components of aircraft, such as wings, wing tips and wing box, fuselage, nose and tail cones, fins, rudders, and the like; and decorative and protective components such as films, tapes, labels, adhesives (which may be a structural adhesive), and the like. In some embodiments, the compositions described herein allow for efficient and/or uniform dispersion of carbon nanotubes. This efficient dispersion may give rise to favorable properties, such as tensile strength, modulus improvements, flexibility, electrical conductivity, and thermal conductivity. Such improvements may have particular application in the fabrication of aircraft parts, for example, allowing for dissipation of thermal and electrical energy from lightning strikes. The articles may be in any form, for instance, in the form of a molded composite or a film.

By sports equipment, it is meant bicycle components, boats and boating equipment, protective equipment such as masks and helmets, hockey sticks, racquets such as tennis racquets, squash racquets, racquetball racquets, badminton racquets, golf equipment such as clubs (including shafts), golf balls, snowshoes, lacrosse sticks, and bats (including softball bats, baseball bats and cricket bats). Similarly, when used in sports equipment, some embodiments of the compositions described herein allow for efficient and/or uniform dispersion of carbon nanotubes. This efficient dispersion may give rise to favorable properties, such as tensile strength, modulus improvements, flexibility, electrical conductivity, and thermal conductivity. Such improvements may have particular application in the fabrication of sports equipment. The articles may be in any form, for instance, in the form of a molded composite or a film.

The compositions according to the present description may be formed, for instance, by high shear mixing. The preparation may include first preparing a dispersion of carbon nanotubes in solvent with block copolymers described herein. The solvent may then be removed, leaving a residue containing the block copolymers and nanotubes. This residue may then be added to a host polymer and then exposed to high shear mixing. Alternatively, the three components, block copolymer, host polymer, and carbon nanotubes, may be added together and then exposed to high shear mixing. In yet another embodiment, a dispersion of carbon nanotubes in solvent with block copolymers may be directly mixed with a resin under high shear conditions. The solvent may then optionally be removed from the composition.

The compositions may also be prepared by other mixing techniques, including melt compounding and ultrasonic mixing.

In some embodiments of the present compositions, the nanotubes are dispersed in the host polymer. In some embodiments of these dispersed compositions, the reagglomeration time of the carbon nanotubes is 50 hours or more, 100 hours or more, or even 1000 hours or more. Some of the compositions have a reagglomeration time of months or even years.

In some embodiments, the compositions described herein have a surface electrical conductivity of at least $5 \times 10^{-7} \Omega^{-1}$ at an effective loading of about 1.5 weight percent, measured according to the four-point probe method described in F. M. Smits, "Measurement of Sheet Resistivities with the Four-Point Probe," *The Bell System Technical Journal*, pp. 711-718, May, 1958 and M. A. Logan, "Sheet Resistivity Measurements on Rectangular Surface-General Solution for Four Point Probe Conversion Factors," *The Bell System Technical Journal*, pp. 2277-2322, December, 1967. By "effective loading" it is meant the total loading of carbon nanotube in a film sample. For instance, for a sample of carbon nanotubes that is 50 percent pure, an effective loading of about 1.5 percent by weight requires an actual loading of material of 3 percent by weight.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used throughout the Examples:

| Abbreviation | Description |
|---|---|
| P(S-4-VP) | Poly(styrene-b-4-vinyl pyridine) block copolymer ($M_n$ = 2.1 × 10$^4$; PDI = 1.8; PS mol % = 97.2; 4-VP mol % = 2.8) was synthesized according to methods described in U.S. Pat. No. 6,969,491 and references therein. |
| HFPOMA | Hexafluoropropylene oxide methacrylate, an oligomeric fluorinated methacrylate ester (Mn = 1400 g/mol), synthesized according to the description in U.S. 2005/137355A1 (Clark et al.) |
| BuLi | Sec-butyl lithium, available from Aldrich Chemical Co., Milwaukee, WI (1.4 Molar in cyclohexane) |
| Toluene | Available from Brenntag Great Lakes, St. Paul, MN |
| DPE | 1,1'-Diphenylethylene, available from Aldrich Chemical Co., Milwaukee, WI |
| OLIGOC4 | $CH_2$=$C(CH_3)CO_2CH_2CH_2S$—[$CH_2CH(CO_2CH_2CH_2N(CH_3)SO_2C_4F_9)]_n$—H (where n = 1-6) synthesized by reaction of methacrylic anhydride and HOCH$_2$CH$_2$S—(CH$_2$CH—(CO$_2$CH$_2$CH$_2$N(CH$_3$)SO$_2$C$_4$F$_9$))$_n$—R, according methods described in U.S. Pat. No. 5,276,175. |
| BA | Behenyl acrylate commercially available from Cognis Corporation, Cinncinnati OH under the trade designation "PHOTOMER 4822" |
| α-Methylstyrene (AMS) | Available from Aldrich Chemical Co., Milwaukee, WI |
| Isoprene (I) | Available from Aldrich Chemical Co., Milwaukee, WI |
| Tetrahydrofuran (THF) | Available from Aldrich Chemical Co., Milwaukee, WI |
| C4-MDI-HEA | $CH_2$=$C(Me)CO_2CH_2CH_2O_2C$—NHC$_6$H$_4$CH$_2$ C$_6$H$_4$NHCO$_2$CH$_2$CH$_2$NMeSO$_2$C4F$_9$ synthesized according to methods described in US2005143541A. |
| CuBr | Copper (I) bromide, Available from Aldrich Chemical Co., Milwaukee, WI |
| Ethyl 2-Bromoisobutyrate | Available from Aldrich Chemical Co., Milwaukee, WI |
| 2,2'-Dipyridyl | Available from Aldrich Chemical Co., Milwaukee, WI |
| MY0510 | Araldite ® MY0510, a glycidyl amine commercially available from Huntsman Speciality Resins (The Woodlands, TX) |
| MY721 | Araldite ®, MY72, a glycidyl amines commercially available from Huntsman Speciality Resins. |
| Cyclohexane | Available from Aldrich Chemical Co., Milwaukee, WI |
| DDS | Diaminodiphenylsulphone, available from Aldrich Chemical Co., Milwaukee, WI |
| SWCNT | Single-wall carbon nanotubes (60% purity by weight), available from Raymor Industries, Montreal, Que., CA. |

Molecular Weight and Polydispersity

Average molecular weight and polydispersity were determined by Gel Permeation Chromatography (GPC) analysis. Approximately 25 mg of a sample were dissolved in 10 milliliters (mL) of THF to form a mixture. The mixture was filtered using a 0.2-micron pore size polytetrafluoroethylene syringe filter. Then, about 150 microliters of the filtered solution were injected into a gel-packed column 25 cm long by 1 cm diameter available under the trade designation "PLGEL-MIXED B" from PolymerLabs, Amherst, Mass. that was part of a GPC system equipped with an autosampler and a pump. The GPC was system operated at room temperature using THF eluent that moved at a flow rate of approximately 0.95 mL/minute. A refractive index detector was used to detect changes in concentration. Number average molecular weight ($M_n$) and polydispersity index (PDI) calculations were calibrated using narrow polydispersity polystyrene controls ranging in molecular weight from 580 to $7.5 \times 10^6$ g/mole. The actual calculations were made with software (available under the trade designation "CALIBER" from Polymer Labs, Amherst, Mass.).

Film Preparation

To form the films, each material to be analyzed was placed between 0.051 mm thick untreated polyester liners, which in turn were placed between 2 aluminum plates (3.2 mm thick each) to form a stack. Two shims (1 mm thick each) were placed to either side of the stack such that upon pressing the assembled stack the mixture would not come into contact with either shim. Each stack was placed in a heated hydraulic press available under the trade designation "WABASH MPI MODEL G30H-15-LP" from Wabash MPI (Wabash Ind.). Both the top and bottom press plates were heated at 193° C. The stack was pressed for 1 minute at 1500 psi (10 MPa). The hot stack was then moved to a low-pressure water-cooled press for 30 seconds to cool the stack. The stack was disassembled and the liners were removed from both sides of the film disc that resulted from pressing the mixture.

Differential Scanning calorimetry

The specimens were prepared by weighing and loading the materials into TA Instruments aluminum auto DSC sample pans. The specimens were analyzed using the TA Instruments 2920 (#92, Cell #633) Modulated® Differential Scanning calorimeter (MDSC) in standard DSC mode.

General Procedure for High Shear Mixing

Host polymer, carbon nanotube, and block copolymer mixtures were blended through use of a IKA T25 basic Ultra Turrax® mixer (available from IKA, Wilmington, N.C.) equipped with a fine mixing head, operating at a rate of 19,000 rpm for a 2 minute period.

General Procedure for Microcompounding

Batch compounding and extrusion was carried out using a 15-mL conical twin-screw micro-compounder, available under the trade designation "DSM RESEARCH 15 ml MICRO-COMPOUNDER" from DSM Xplore; The Netherlands. All six controlled heating zones for the micro-compounder were operated at 200° C. with a screw speed of 125 rpm. During the material feeding and mixing process, the exit valve was set to allow material to flow through the recirculating channel in order to control both the mix time and the batch formulation. Polymer resin pellets and/or the pre-blended polymer/single-walled carbon nanotubes mixtures were added to the micro-compounder using the manually operated feed hopper, with a total charge size of 15.0 g. After the materials were fed, the manual hopper was removed, and the plugging insert was utilized to ensure that the materials being mixed would not be able to escape the extruder. Once the feed port was plugged, the sample was blended in the recirculating compounder for 3.0 minutes. Midway through the mixing cycle, the product melt temperature and force were recorded for each sample. After the 3-minute mix time, the exit valve was opened in order to extrude a strand of the compounded sample, which was collected for further analysis.

General Procedure for Determining Surface Resistivity

Surface resistivity measurements were conducted on composite films made as described under "Film Preparation" using an ETS (Electro-tech Systems) Wide Range Resistance Meter Model 872A (available from Electro-tech Systems, Glenside, Pa.), according to the four-point probe method described in F. M. Smits, "Measurement of Sheet Resistivities with the Four-Point Probe," *The Bell System Technical Journal*, pp. 711-718, May, 1958 and M. A. Logan, "Sheet Resistivity Measurements on Rectangular Surface-General Solution for Four Point Probe Conversion Factors," *The Bell System Technical Journal*, pp. 2277-2322, December, 1967.

Comparative Example 1 (CE1)

A slurry of epoxy resin and SWCNT was formed according to Table 1. The resultant slurry was mixed according to the General Procedure for High Shear Mixing. To observe the level of dispersion stability, 1 ml samples of the slurry were placed on a glass microscope slide and the resultant coated slides were heated to 125° C. Upon reaching this temperature, the viscosity of the slurry dropped and the dispersion of the nanotubes became destabilized, resulting in the production of large agglomerates which were apparent visually.

TABLE 1

| Example | Block Copolymer (grams) | Resin (grams) | SWCNT (grams) | Stability | DBS (grams) |
|---------|-------------------------|---------------|---------------|-----------|-------------|
| CE 1    | None                    | MY0510 (100 g)| 0.05          | No        |             |
| CE 2    | None                    | PMMA (14.95)  | 0.05          | No        |             |
| EX 1    | P(S-4-VP) (0.05)        | MY0510 (100 g)| 0.05          | Yes       |             |
| EX 2    | PS-4-VP (0.05)          | PMMA (14.90)  | 0.05          | Yes       |             |
| EX 6    | P(S-HFPOMA) (10.0)      | None          | 0.05          |           |             |
| EX 7    | P(BA-C4-MDI-HEA) (9.10) | None          | 0.05          |           |             |
| EX 8    | P(I-OLIGOC4) (50.0)     | None          | 0.05          |           |             |
| CE 3    | None                    | MY0510 (100)  | 1.01          | No        | 36.3        |
| EX 9    | PSVP (1.0)              | MY0510 (100)  | 1.0           | Yes       | 36.3        |
| CE 4    | None                    | MY721 (100)   | 2.2           | No        | 36.3        |
| EX 10   | PSVP (2.2)              | MY0510 (100)  | 2.2           | Yes       | 36.3        |

Comparative Example 2 (CE2)

A blend of PMMA and SWCNT was prepared in quantities as listed in Table 1. This blend of materials was added to the barrel of the microcompounder according to the General Procedure for Microcompounding. Contents of the microcompounder were mixed at 125 rpm for 3 minutes. Processing conditions for the melt processing examples are shown in Table 2.

TABLE 2

| Example | Screw Speed (rpm) | Melt Force (N) | Temp (° C.) | Barrel Temperature (° C.) | | | | | |
|---|---|---|---|---|---|---|---|---|---|
| | | | | Top (Back) | Top (Front) | Center (Back) | Center (Front) | Bottom (Back) | Bottom (Front) |
| CE2 | 125.0 | 3988 | 191.8 | 200.7 | 200.8 | 200.5 | 200.3 | 200.0 | 199.9 |
| EX2 | 125.0 | 3871 | 192.9 | 200.5 | 200.7 | 200.5 | 200.5 | 200.1 | 200.2 |

Example 1 (EX1)

A slurry of epoxy resin, block copolymer and SWCNT was formed according to Table 1. The resultant slurry was mixed according to the General Procedure for High Shear Mixing. To observe the level of dispersion stability, 1 ml samples of the slurry were placed on a glass microscope slide and the resultant coated slides were heated to 125° C. Upon reaching this temperature, the viscosity of the slurry dropped slightly and the dispersion of the nanotubes remained stable, resulting in the production of a well dispersed nanocomposite.

Example 2 (EX 2)

A blend of PMMA, P(S-VP) and SWCNT was prepared in quantities as listed in Table 1. This blend of materials was added to the barrel of the microcompounder according to the General Procedure for Microcompounding. Contents of the microcompounder were mixed at 125 rpm for 3 minutes. Processing conditions for the melt processing examples are shown in Table 2.

Example 3 (EX3)

Synthesis of P(S-b-HFPOMA) Block Copolymer Via Continuous Polymerization

The P(S-b-HFPOMA) block copolymer was synthesized by sequential anionic polymerization. A "living" polystyrene polymer was synthesized in a 0.94 L stirred tubular reactor (STR) according to the methods outlined in U.S. Pat. No. 6,969,491. The "living" polystyrene-DPE polymer was synthesized continuously in the STR and collected under nitrogen in a separate vessel. 30.5 g of HFPOMA was added to 1000 g of the "living" polymer solution and the solution was shaken vigorously to form the P(S-b-HFPOMA) block copolymer. Tables 3-5 detail the experimental conditions, temperature profile and polymer analytical data for the P(S-b-HFPOMA) block copolymer, respectively.

TABLE 3

| Reagent | Entry Zone | Flowrate (g/min) |
|---|---|---|
| sec-butyllithium (1.0 wt % in cyclohexane) | 1 | 3.9 |
| Toluene | 1 | 30.1 |
| Styrene | 1 | 16.1 |
| DPE (3.7 wt % in toluene) | 5 | 3.4 |

TABLE 4

Temperature Profile: Set Temps (° C.)

| T1 | T2 | T3 | T4 | T5 |
|---|---|---|---|---|
| 70 | 50 | 50 | 20 | 20 |

TABLE 5

Polymer Analytical Data for P(S-b-HFPOMA Block Copolymer

| Styrene (mole %) | HFPOMA (mole %) | Mn (×104) | PDI |
|---|---|---|---|
| 96.1 | 3.9 | 2.8 | 1.7 |

Example 4 (EX4)

Synthesis of Poly(Behenyl Acrylate-b-C4-MDI-HEA) (P(BA-C4-MDI-HEA) Block Copolymer Via Batch Polymerization The P(BA-b-C4-MDI-HEA) block copolymer was synthesized by sequential atom transfer radical polymerization in toluene at 90° C. using CuBr/ethyl 2-bromoisobutyrate/2,2' dipyridyl as an initiator system. Behenyl acrylate (35 g) as mixed with CuBr (0.85 g) and 2-bromoisobutyrate in toluene (500 ml) and heated to 90° C. Once this mixture reached 90 C, 2,2' dipyridyl (1.87 g) was added and the mixture was stirred at 90° C. for one hour. After 1 hour, C4-MDI-HEA (25 g) monomer was added to this mixture and stirred at 90° C. for an additional 1 hr. The resultant P(BA-C4-MDI-HEA) block copolymer was isolated as a white powder, after column chromatographic purification using basic alumina, followed by precipitation in methanol and filtration. The molecular weight and composition of these materials were determined by GPC and $^1$H NMR, respectively (Table 6. $^1$H NMR assignment: 7.37 (m, 4H, MHI-Aromatic), 7.09 (m, 4H, MDI Aromatic), 4.32 ($C_4$—$CH_2$O-urethane), 4.24 (not assigned), 4.16 (m, HEA-$CH_2$-urethane), 4.05 (m, Behenyl $CH_2$—O), 3.89 (m, 1H, N—$CH_2$), 3.85 (m, $CH_2$-MDI), 3.4 (m, 1H, $NCH_2$), 3.16 (s, $NCH_3$), 2.5-2.2 (backbone CH), 1.61 (m, $CH_2$ Behenyl) 1.32 (s, Behenyl main chain), 0.88 (t, Behenyl terminal $CH_3$).

TABLE 6

Polymer Analytical Data for P(BA-b-C4-MDI-HEA) Block Copolymer

| BA mole % (wt %) | C4-MDI-HEA mole % (wt %) | $M_n$ (×10$^3$) | PDI |
|---|---|---|---|
| 76.2 (63.1) | 23.8 (36.9) | 2.7 | 1.8 |

Example 5 (EX5)

Synthesis of P(I-b-OLIGOC4) Block Copolymer Via Continuous Polymerization

The P(I-b-OLIGOC4) block copolymer was synthesized by sequential anionic polymerization according to the methods outlined in U.S. Pat. No. 6,969,491. Tables 7-9 detail the experimental conditions, temperature profile and polymer analytical data for the P(I-b-OLIGOC4) block copolymer respectively, corresponding to Examples 5a-5d. 1,2-polyisoprene, 1,4-polyisoprene, 3,4-polyisoprene, and OLIGOC4 are incorporated into the block copolymer, OLIGOC4 monomer is residual monomer in the block copolymer.

TABLE 7

| Reagent | Entry Zone | Flowrates (g/min) | | | |
|---|---|---|---|---|---|
| | | 5a | 5b | 5c | 5d |
| BuLi (3.8% in cyclohexane) | 1 | 1.9 | 1.9 | 1.9 | 1.5 |
| Toluene | 1 | 15.4 | 15.4 | 15.4 | 15.4 |
| Isoprene | 1 | 17.5 | 17.5 | 17.5 | 17.5 |
| THF | 1 | 2.0 | 2.0 | 2.0 | 2.0 |
| AMS (27.2% in toluene) | 3 | 1.0 | 1.0 | 1.0 | 1.0 |
| OLIGOC4 (32% solution in toluene) | 4 | 4.3 | 10.7 | 21.4 | 8.0 |

TABLE 8

Temperature Profile: Set Temps (° C.)

| T1 | T2 | T3 | T4 | T5 |
|---|---|---|---|---|
| 10 | 70 | 15 | 0 | 0 |

TABLE 9

Polymer Analytical Data for P(I-b-OLIGOC4) Block Copolymer

| Sample | 1,2 PI mole % | 1,4 PI mole % | 3,4 PI mole % | OLIGOC4 polymer mole % | OLIGOC4 monomer mole % | Mn (×10$^4$) |
|---|---|---|---|---|---|---|
| 5a | 7.1 | 39.9 | 52.6 | 0.4 | 0.0 | 1.48 |
| 5b | 7.2 | 38.2 | 53.0 | 1.5 | 0.0 | 1.50 |
| 5c | 6.8 | 38.2 | 52.3 | 2.4 | 0.3 | 1.33 |
| 5d | 8.1 | 35.3 | 55.6 | 1.0 | 0.0 | 2.10 |

Example 6-8 (EX 6-EX8)

A blend of fluorinated block copolymer and SWCNT was prepared in quantities as listed in Table 1. This blend of materials was added to the barrel of the microcompounder according to the General Procedure for Microcompounding. Contents of the microcompounder were mixed at 125 rpm for 3 minutes. Processing conditions for the melt processing examples are shown in Table 10.

TABLE 10

| Example | Screw Speed (rpm) | Melt Force (N) | Temp (° C.) | Barrel Temperature (° C.) | | | | |
|---|---|---|---|---|---|---|---|---|
| | | | | Top (Back) | Top (Front) | Center (Back) | Center (Front) | Bottom (Back) | Bottom (Front) |
| EX6 | 125.0 | 3500 | 193.8 | 200.7 | 200.8 | 200.5 | 200.5 | 200.7 | 199.9 |
| EX7 | 125.0 | 3800 | 194.9 | 200.5 | 200.8 | 200.5 | 200.5 | 200.1 | 200.1 |
| EX8 | 126.0 | 3850 | 194.9 | 201.0 | 200.8 | 200.4 | 200.3 | 200.2 | 200.3 |

Comparative Example 3-4 (CE3-CE4)

A mixture of epoxy resin MY0710 and DDS as described in Table 1 was cured at 180° C. according to the procedures outlined by Benzadi and Jones, *Journal of Macromolecular Science Part B: Physics,* 44:993-1005, 2005. The percentage of SWCNT in these samples was varied according to Table 1.

The resultant composite CE3 was analyzed by DSC (Table 11, 12). Surface resistivity studies were conducted on Composite CE4 to ascertain the effect of nanotube incorporation on composite conductivity. Composite CE4 exhibited conductivity values of $2.0 \times 10^{-8} \Omega^{-1}$.

Example 9-10 (EX9-EX10)

A mixture of epoxy resin MY0710, P(S-b-4-VP), SWCNT and DDS as described in Table 1 (EX9 and EX10) was cured at 180° C. according to the procedures outlined by Benzadi and Jones, *Journal of Macromolecular Science Part B: Physics,* 44:993-1005, 2005. The resultant composite EX9 was analyzed by DSC (Tables 11 and 12), which confirms that the addition of the block copolymer in this system imparts no detrimental effect on Composite thermal properties. Surface resistivity studies were conducted on Composite EX10 to ascertain the effect of nanotube incorporation on composite conductivity. Composite EX10 exhibited conductivity values of $1.0 \times 10^{-6} \Omega^{-1}$, which is two orders of magnitude higher than Composite CE4, owing to the higher degree of SWCNT dispersion in EX10.

TABLE 11

First Heat Glass Transition Results, Standard DSC (heat flow data), 50° C./min in Nitrogen

| Example | Onset ° C. | Midpoint (H) ° C. | End ° C. | Delta Cp J/(g · ° C.) | Analysis Range ° C. | Start ° C. | Stop ° C. |
|---|---|---|---|---|---|---|---|
| CE3 | 105 | 120 | 135 | 0.42 | 73-160 | 73 | 160 |
| EX9 | 138 | 156 | 174 | 0.38 | 93-191 | 93 | 191 |

TABLE 12

Second Heat Glass Transition Results, Standard DSC (heat flow data), 50° C./min in Nitrogen

| Example | Onset ° C. | Midpoint (H) ° C. | End ° C. | Delta Cp J/(g · ° C.) | Analysis Range ° C. | Start ° C. | Stop ° C. |
|---|---|---|---|---|---|---|---|
| CE3 | 223 | 238 | 254 | 0.22 | 186-270 | 186 | 270 |
| EX9 | 241 | 255 | 270 | 0.18 | 206-284 | 206 | 284 |

We claim:
1. A composite composition comprising:
  a plurality of carbon nanotubes;
  a cured thermoset polymer; and
  a block copolymer comprising at least one hexafluoropropylene oxide methacrylate block, wherein the final said composite composition is without solvent.

2. The composition of claim 1 wherein the cured thermoset polymer is an epoxy polymer.

* * * * *

UNITED STATES PATENT AND TRADEMARK OFFICE
CERTIFICATE OF CORRECTION

| | | |
|---|---|---|
| PATENT NO. | : 8,557,918 B2 | Page 1 of 1 |
| APPLICATION NO. | : 12/978670 | |
| DATED | : October 15, 2013 | |
| INVENTOR(S) | : James M. Nelson et al. | |

It is certified that error appears in the above-identified patent and that said Letters Patent is hereby corrected as shown below:

On the Title Page:

Column 2 line 19
Item [56]; References Cited; OTHER PUBLICATIONS;
　　delete "Resistivites" and insert -- Resistivities -- therefor.

In the Specification:

Column 3
Line 26; delete "poly(-methyl-1-pentene)" and insert -- poly(4-methyl-1-pentene) -- therefor.

Column 7
Line 24; delete "C1 to C10" and insert -- $C_1$ to $C_{10}$ -- therefor.

Column 10
Table; Abbreviation BA; Description;
　　delete "Cinncinnati" and insert -- Cincinnati -- therefor.

Signed and Sealed this
Eighteenth Day of March, 2014

Michelle K. Lee
*Deputy Director of the United States Patent and Trademark Office*